US008884590B2

(12) United States Patent
Oyori et al.

(10) Patent No.: US 8,884,590 B2
(45) Date of Patent: Nov. 11, 2014

(54) ELECTRICITY GENERATION DEVICE AND PERMANENT-MAGNET ELECTRIC GENERATOR

(75) Inventors: Hitoshi Oyori, Tokyo (JP); Yukio Shimomura, Tokyo (JP)

(73) Assignees: IHI Aerospace Co., Ltd., Tokyo (JP); Sinfonia Technology Co., Ltd., Tokyo (JP)

(*) Notice: Subject to any disclaimer, the term of this patent is extended or adjusted under 35 U.S.C. 154(b) by 383 days.

(21) Appl. No.: 13/485,727

(22) Filed: May 31, 2012

(65) Prior Publication Data

US 2012/0306462 A1      Dec. 6, 2012

(30) Foreign Application Priority Data

Jun. 3, 2011   (JP) ................................. 2011-125377

(51) Int. Cl.
| | |
|---|---|
| H02P 9/14 | (2006.01) |
| H02P 29/02 | (2006.01) |
| H02P 9/10 | (2006.01) |
| H02P 9/00 | (2006.01) |

(52) U.S. Cl.
CPC ............... *H02P 9/006* (2013.01); *H02P 29/02* (2013.01); *H02P 9/10* (2013.01)
USPC .............................................. 322/46; 322/91

(58) Field of Classification Search
CPC ............ H02P 9/006; H02P 29/02; H02P 9/10
USPC .................... 322/24, 28, 44, 89, 91
See application file for complete search history.

(56) References Cited

U.S. PATENT DOCUMENTS

| | | | | |
|---|---|---|---|---|
| 5,723,973 | A | * | 3/1998 | Umeda et al. .................... 322/20 |
| 7,274,547 | B2 | * | 9/2007 | Al-Khayat et al. .......... 361/93.1 |
| 8,125,747 | B2 | * | 2/2012 | Ganev et al. ..................... 361/23 |
| 2007/0030606 | A1 | * | 2/2007 | Ganev et al. .................... 361/23 |
| 2007/0114977 | A1 | * | 5/2007 | Andrieux ......................... 322/99 |
| 2008/0265818 | A1 | * | 10/2008 | Leutner ......................... 318/465 |

FOREIGN PATENT DOCUMENTS

| | | |
|---|---|---|
| JP | 2003-189697 A | 7/2003 |
| JP | 2005-204482 A | 7/2005 |
| JP | 2005-261008 A | 9/2005 |

OTHER PUBLICATIONS

Extended European Search Report for EP 12 16 8599, dated Sep. 12, 2012.

* cited by examiner

*Primary Examiner* — Tulsidas C Patel
*Assistant Examiner* — Viet Nguyen
(74) *Attorney, Agent, or Firm* — Marshall, Gerstein & Borun LLP

(57) ABSTRACT

An electricity generation device includes a permanent-magnet electric generator with three or more phase windings each having an output terminal and connected to a neutral point, and bidirectional semiconductor switching circuits capable of interrupting connections between the respective phase windings and the neutral point. Each switching circuit allows current to flow in both directions. A gate signal generation circuit outputs to one of the switching circuits during a period including the time at which the AC voltage excited in the corresponding phase winding turns from positive to negative and during a period including the time at which the AC voltage excited in the corresponding phase winding turns from negative to positive. A startup gate signal output circuit outputs a startup gate signal to all of the bidirectional semiconductor switching circuits when the permanent-magnet electric generator is to be started.

6 Claims, 10 Drawing Sheets

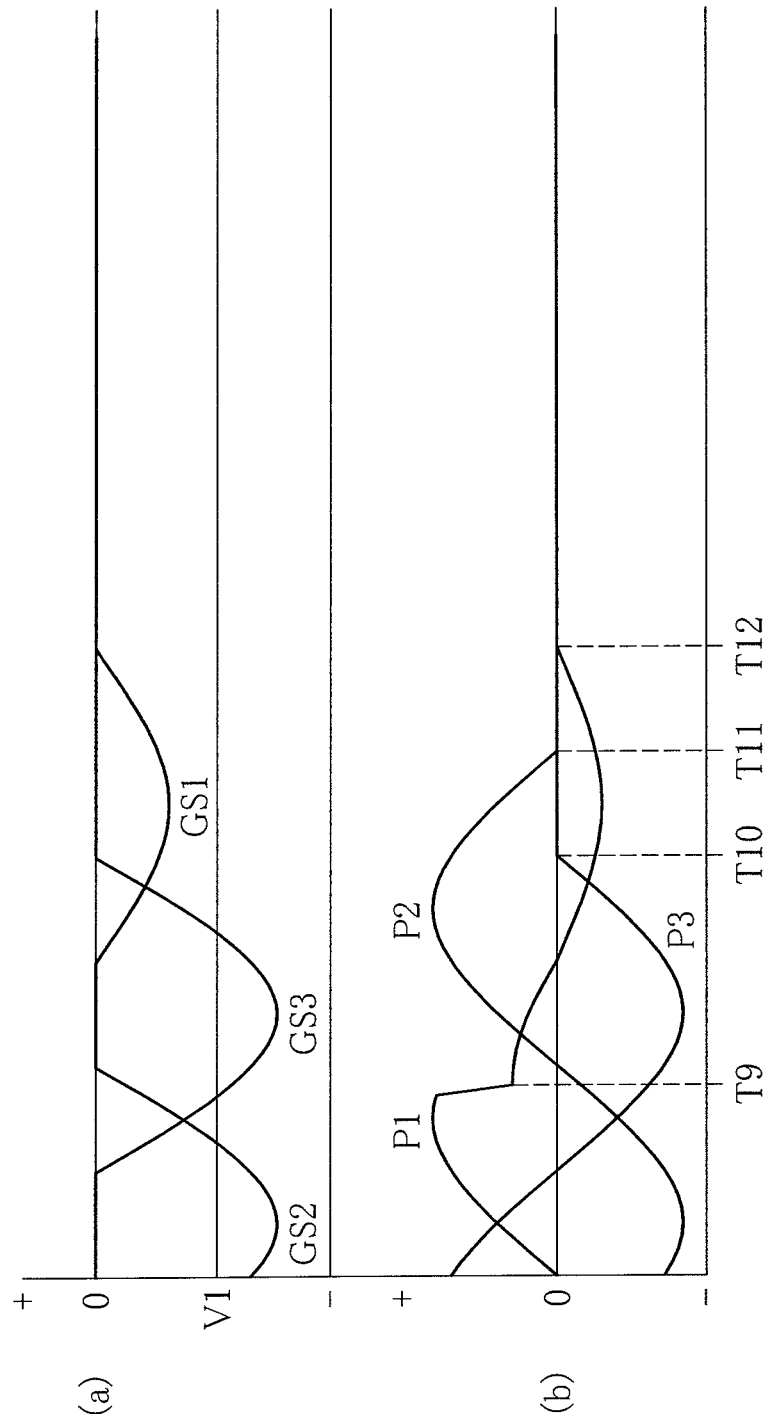

Ｕ S 8,884,590 B2

ELECTRICITY GENERATION DEVICE AND PERMANENT-MAGNET ELECTRIC GENERATOR

BACKGROUND OF THE INVENTION

1. Field of the Invention

The present invention relates to a permanent-magnet electric generator using permanent magnets as its field system, and an electricity generation device provided with the permanent-magnet electric generator.

2. Description of the Related Art

As such permanent-magnet electric generators using permanent magnets as their field system, a three-phase alternating-current (AC) generator has been known, for example. In the three-phase AC generator using permanent magnets, a rotor constituted by the permanent magnets is rotated inside a stator constituted by a three-phase winding, for example, to generate three-phase AC power in accordance with the law of electromagnetic induction. Compared with an electromagnet electric generator using electromagnets as its field system, the permanent-magnet electric generator has the advantages of simpler structure, easier maintenance and the like, because the permanent-magnet electric generator does not require a power circuit for field excitation and also does not have electrical contacts, such as a slip ring or brush, for guiding electric current from an external power circuit to the rotating field.

Meanwhile, conventional permanent-magnet electric generators do not stop generating electricity unless and until the rotor is stopped, even if an electricity generation device equipped with the electric generator develops some trouble or failure. If a circuit breaker is provided between the output of the permanent-magnet electric generator and a load, for example, the supply of electric power from the permanent-magnet electric generator to the load can be shut off in the event some trouble or failure has occurred in the electricity generation device. As conventional techniques for shutting off or restraining the power supply from a permanent-magnet electric generator to a load, a permanent-magnet electric generator with a clutch mechanism capable of interrupting the transmission of rotary driving force to the rotor has been known, for example (see Japanese Laid-open Patent Publication No. 2005-261008). There has also been known a rotary electric machine which includes a rotor provided with field windings in addition to permanent magnets and which is capable of stopping the output of an output current by controlling the field current flowing through the field windings (see Japanese Laid-open Patent Publication No. 2005-204482). Further, a permanent-magnet electric generator has been known which is provided with a regulator (voltage regulation device) capable of controlling the output voltage in accordance with load condition (see Japanese Laid-open Patent Publication No. 2003-189697).

According to the conventional technique disclosed in Japanese Laid-open Patent Publication No. 2005-261008, however, the electricity generation device is complex in structure and large in size because of the clutch mechanism provided therein, which possibly leads to a significant increase in cost. In the conventional techniques disclosed in Japanese Laid-open Patent Publications No. 2005-204482 and No. 2003-189697, on the other hand, if phase-to-phase short circuit, for example, occurs within the permanent-magnet electric generator, the short-circuit current cannot be stopped, and therefore, it is not possible to prevent the permanent-magnet electric generator from suffering burnout or the like due to the phase-to-phase short circuit. This also applies, for example, to the case where the electricity generation device is provided with a circuit breaker for shutting off the output of the permanent-magnet electric generator. Further, the conventional techniques disclosed in the aforementioned publications are associated with the problem that, since the output voltages of the permanent-magnet electric generator are shut off or restrained in accordance with an externally monitored condition, a certain length of time is required to shut off or restrain the output voltages after the occurrence of anomaly or failure in the permanent-magnet electric generator.

SUMMARY OF THE INVENTION

An aspect of the present invention is directed to an electricity generation device provided with a permanent-magnet electric generator including three or more phase windings each having one end serving as an output terminal and the other end connected to a neutral point. The electricity generation device comprises: bidirectional semiconductor switching circuits connected between the respective phase windings of the permanent-magnet electric generator and the neutral point and capable of interrupting connections between the respective phase windings and the neutral point, each of the bidirectional semiconductor switching circuits allowing electric current to flow therethrough in both directions in a conduction state and, after being input with a gate signal, retaining the conduction state by itself until the electric current stops flowing therethrough; a self-excited gate signal generation circuit configured to generate a gate signal for each of the bidirectional semiconductor switching circuits associated with the respective phase windings of the permanent-magnet electric generator from alternating-current voltages excited in those of the phase windings which are associated with others of the bidirectional semiconductor switching circuits in such a manner that the gate signal is output to one of the bidirectional semiconductor switching circuits during a period including a time at which the alternating-current voltage excited in a corresponding one of the phase windings turns from positive to negative and during a period including a time at which the alternating-current voltage excited in the corresponding one of the phase windings turns from negative to positive; and a startup gate signal output circuit configured to output a startup gate signal to all of the bidirectional semiconductor switching circuits when the permanent-magnet electric generator is to be started.

The bidirectional semiconductor switching circuits are connected between the respective phase windings of the permanent-magnet electric generator and the neutral point and capable of interrupting the connections between the respective phase windings and the neutral point. Each bidirectional semiconductor switching circuit allows electric current to flow therethrough in both directions in the conduction state and, after being input with the gate signal, retains the conduction state by itself until the current stops flowing therethrough. The gate signal is output from the self-excited gate signal generation circuit during a period including the time at which the alternating-current voltage excited in a corresponding one of the phase windings turns from positive to negative and during a period including the time at which the alternating-current voltage excited in the corresponding phase winding turns from negative to positive. Thus, the gate signals are output from the self-excited gate signal generation circuit during the respective periods insofar as the alternating-current voltages are normally excited in the individual phase windings of the permanent-magnet electric generator, so that the conduction states of the bidirectional semiconductor switching circuits are maintained. That is, while the permanent-magnet electric generator is normally generating electricity, the individual phase windings are kept connected to the neutral point, and therefore, the permanent-magnet electric generator can continue normally generating electricity.

Also, the self-excited gate signal generation circuit generates the gate signal for each of the bidirectional semiconductor switching circuits associated with one of the phase windings from the alternating-current voltages excited in others of the phase windings. If phase-to-phase short circuit occurs, the voltage of the phase winding involved in the phase-to-phase short circuit lowers. Thus, where the voltage of a certain phase winding drops due to phase-to-phase short circuit caused within the permanent-magnet electric generator, the gate signal generated from the voltage of that phase winding is not output any longer, with the result that the bidirectional semiconductor switching circuit which has been turned on by that gate signal until then turns off by itself and comes into a non-conduction state. Then, the phase winding associated with the bidirectional semiconductor switching circuit which has turned off by itself is disconnected from the neutral point, and therefore, the gate signal generated by the voltage of that phase winding is no longer output, so that the bidirectional semiconductor switching circuit which has been turned on by that gate signal until then turns off by itself and comes into a non-conduction state. In this manner, if phase-to-phase short circuit occurs within the permanent-magnet electric generator and the voltage of a certain phase winding drops as a result, all of the bidirectional semiconductor switching circuits turn off by themselves one after another and come into a non-conduction state, with the result that all of the phase windings are disconnected from the neutral point. That is, where phase-to-phase short circuit has occurred within the permanent-magnet electric generator, all of the phase windings cease to flow current therethrough, whereby the short-circuit current attributable to the phase-to-phase short circuit can be promptly stopped even while the rotor is rotating.

In the electricity generation device of the present invention, the short-circuit current attributable to phase-to-phase short circuit can be quickly stopped even while the rotor of the permanent-magnet electric generator is rotating, as stated above, and it is therefore unnecessary to provide a clutch mechanism for interrupting the transmission of rotary driving force to the rotor, unlike the conventional device. Accordingly, the electricity generation device does not require a complex structure and need not be increased in size.

Thus, the present invention is advantageous in that an inexpensive electricity generation device can be provided of which the permanent-magnet electric generator is less likely to suffer burnout or the like even if phase-to-phase short circuit occurs within the permanent-magnet electric generator.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 4 is a timing chart illustrating how the electricity generation device of the first embodiment operates when phase-to-phase short circuit occurs;

DETAILED DESCRIPTION OF THE INVENTION

Referring to FIGS. 1 to 6, a first embodiment of the present invention will be described.

First, the configuration of an electricity generation device 100 according to the first embodiment will be explained with reference to FIG. 1.

Figure 1:
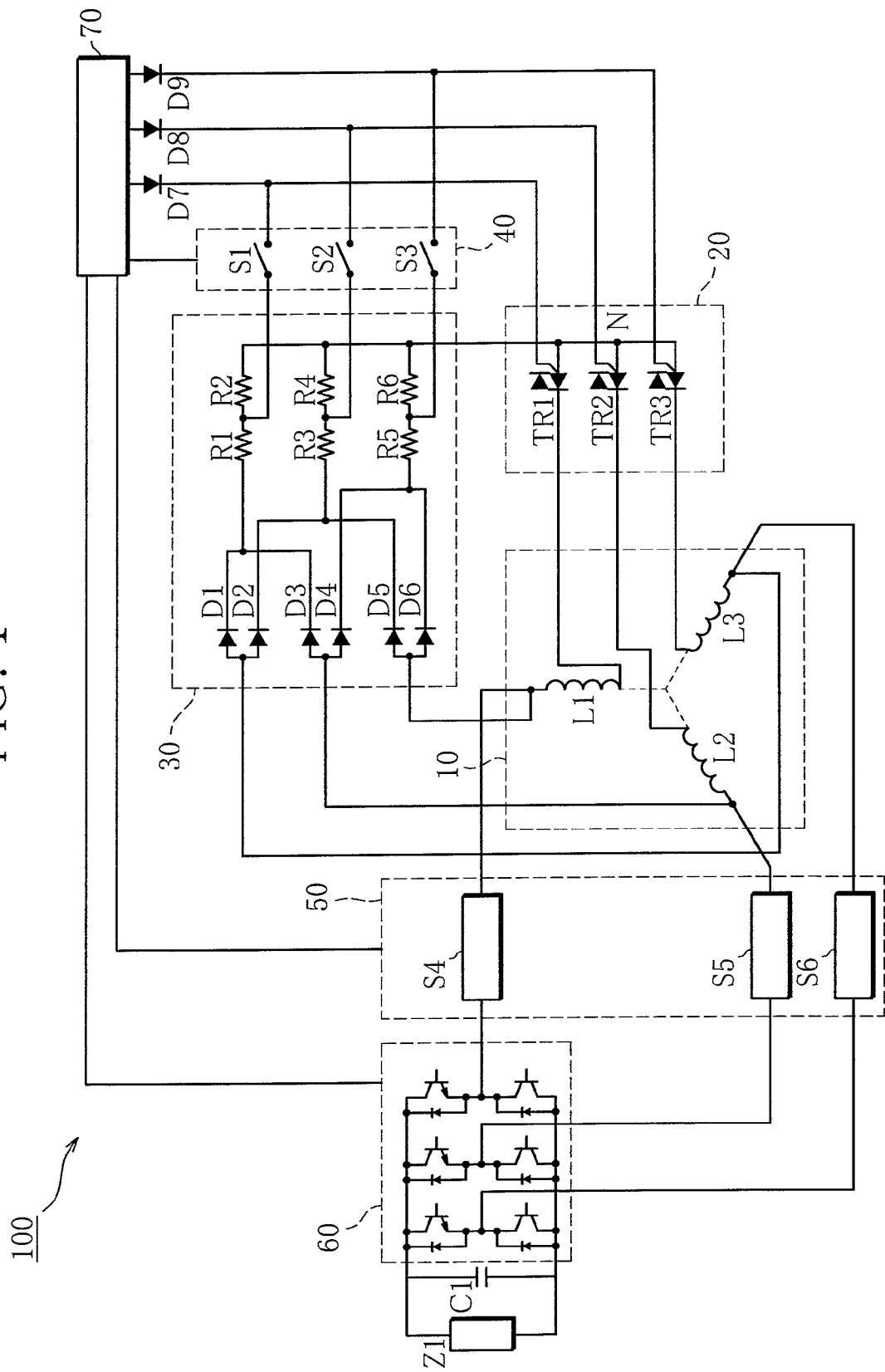
FIG. 1 illustrates an entire configuration of an electricity generation device according to a first embodiment.

FIG. 1 illustrates an entire configuration of the electricity generation device 100 according to the first embodiment.

In the electricity generation device 100 of the first embodiment, alternating-current (AC) power generated by a three-phase AC generator 10 is converted to direct-current power by a converter circuit 60 and a smoothing capacitor C1, and the direct-current power is supplied to a load Z1. The electricity generation device 100 is further provided with a first shutoff circuit 20, a self-excited gate signal generation circuit 30, a gate signal shutoff circuit 40, a second shutoff circuit 50, and a controller 70.

The three-phase AC generator 10 is a "permanent-magnet electric generator" using permanent magnets as its field system, and includes a stator constituted by first-, second- and third-phase windings L1, L2 and L3, and a rotor (not shown) constituted by the permanent magnets that rotate inside the stator. The first- to third-phase windings L1 to L3 are arranged with their phases shifted from each other by 120 degrees in the rotating direction of the rotor, and each have one end serving as an output terminal and the other end connected to a neutral point N. The three-phase AC generator 10 generates three-phase AC power as the rotor is rotated by rotary driving force transmitted thereto from a drive source such as an engine.

The first shutoff circuit 20 includes first, second and third bidirectional thyristors TR1, TR2 and TR3. Each of the first to third bidirectional thyristors TR1 to TR3 is a commonly known "bidirectional semiconductor switching circuit" which, in a conduction state, allows electric current to flow therethrough in both directions and which, after a gate signal is input, retains the conduction state by itself until the electric current stops flowing therethrough. The first bidirectional thyristor TR1 is connected between the first-phase winding L1 of the three-phase AC generator 10 and the neutral point N and capable of interrupting the connection between the first-phase winding L1 and the neutral point N. Similarly, the second bidirectional thyristor TR2 is connected between the second-phase winding L2 of the three-phase AC generator 10 and the neutral point N and capable of interrupting the connection between the second-phase winding L2 and the neutral point N, and the third bidirectional thyristor TR3 is connected between the third-phase winding L3 of the three-phase AC generator 10 and the neutral point N and capable of interrupting the connection between the third-phase winding L3 and the neutral point N. The first to third bidirectional thyristors TR1 to TR3 are each input at their gate with a gate signal from the self-excited gate signal generation circuit 30 or the controller 70.

The self-excited gate signal generation circuit 30 includes diodes D1 to D6 and resistors R1 to R6. The diodes D1 and D2 have their anodes connected to the output terminal of the third-phase winding L3 of the three-phase AC generator 10. The diodes D3 and D4 have their anodes connected to the output terminal of the second-phase winding L2 of the three-phase AC generator 10, and the diodes D5 and D6 have their anodes connected to the output terminal of the first-phase winding L1 of the three-phase AC generator 10. The resistors R1, R3 and R5 have an identical resistance value, and the resistors R2, R4 and R6 have an identical resistance value.

The diodes D1 and D3 have their cathodes connected to one terminal of the resistor R1. The other terminal of the resistor R1 is connected to one terminal of the resistor R2, of which the other terminal is connected to the neutral point N of the three-phase AC generator 10. The node between the resistors R1 and R2 is connected via the gate signal shutoff circuit 40 to the gate of the first bidirectional thyristor TR1. That is, a voltage obtained by dividing the logical sum of phase voltages of the second- and third-phase windings L2 and L3 by the resistance ratio of the resistors R1 and R2 is applied as a gate signal to the first bidirectional thyristor TR1.

The diodes D2 and D5 have their cathodes connected to one terminal of the resistor R3. The other terminal of the resistor R3 is connected to one terminal of the resistor R4, of which the other terminal is connected to the neutral point N of the three-phase AC generator 10. The node between the resistors R3 and R4 is connected via the gate signal shutoff circuit 40 to the gate of the second bidirectional thyristor TR2. That is, a voltage obtained by dividing the logical sum of phase voltages of the first- and third-phase windings L1 and L3 by the resistance ratio of the resistors R3 and R4 is applied as a gate signal to the second bidirectional thyristor TR2.

The diodes D4 and D6 have their cathodes connected to one terminal of the resistor R5. The other terminal of the resistor R5 is connected to one terminal of the resistor R6, of which the other terminal is connected to the neutral point N of the three-phase AC generator 10. The node between the resistors R5 and R6 is connected via the gate signal shutoff circuit 40 to the gate of the third bidirectional thyristor TR3. That is, a voltage obtained by dividing the logical sum of phase voltages of the first- and second-phase windings L1 and L2 by the resistance ratio of the resistors R5 and R6 is applied as a gate signal to the third bidirectional thyristor TR3.

The gate signal shutoff circuit 40 includes three switches S1 to S3 capable of shutting off the respective gate signals output from the self-excited gate signal generation circuit 30. The switch S1 is able to pass and shut off the gate signal output from the node between the resistors R1 and R2 to the gate of the first bidirectional thyristor TR1. The switch S2 is able to pass and shut off the gate signal output from the node between the resistors R3 and R4 to the gate of the second bidirectional thyristor TR2, and the switch S3 is able to pass and shut off the gate signal output from the node between the resistors R5 and R6 to the gate of the third bidirectional thyristor TR3. For the switches S1 to S3, mechanical switches or contacts, electromagnetic relays, solid-state relays, or semiconductor switches constituted by transistors or FETs, for example, may be used.

The second shutoff circuit 50, which is an "output shutoff circuit", includes three circuit breakers S4 to S6 capable of shutting off the respective AC outputs from the three-phase AC generator 10 to the converter circuit 60. The circuit breaker S4 is able to shut off the output from the first-phase winding L1 to the converter circuit 60. The circuit breaker S5 is able to shut off the output from the second-phase winding L2 to the converter circuit 60, and the circuit breaker S6 is able to shut off the output from the third-phase winding L3 to the converter circuit 60. For the circuit breakers S4 to S6, mechanical switches or contacts, electromagnetic relays, or solid-state relays, for example, may be used.

The controller 70, which serves as a "startup gate signal output circuit", includes a microcomputer control circuit known in the art and is connected via diodes D7 to D9 to the gates of the first to third bidirectional thyristors TR1 to TR3, respectively. When the three-phase AC generator 10 is to be started, the controller 70 outputs gate signals to the first to third bidirectional thyristors TR1 to TR3, respectively. The controller 70 is connected to the gate signal shutoff circuit 40 and controls the switches S1 to S3. Also, the controller 70 is connected to the second shutoff circuit 50 and controls the circuit breakers S4 to S6. Further, the controller 70 is connected to the converter circuit 60 and controls the voltage of the direct-current power output from the converter circuit 60.

Referring now to the timing charts of FIGS. 2 to 4, the operation of the electricity generation device 100 of the first embodiment will be explained.

Figure 2:
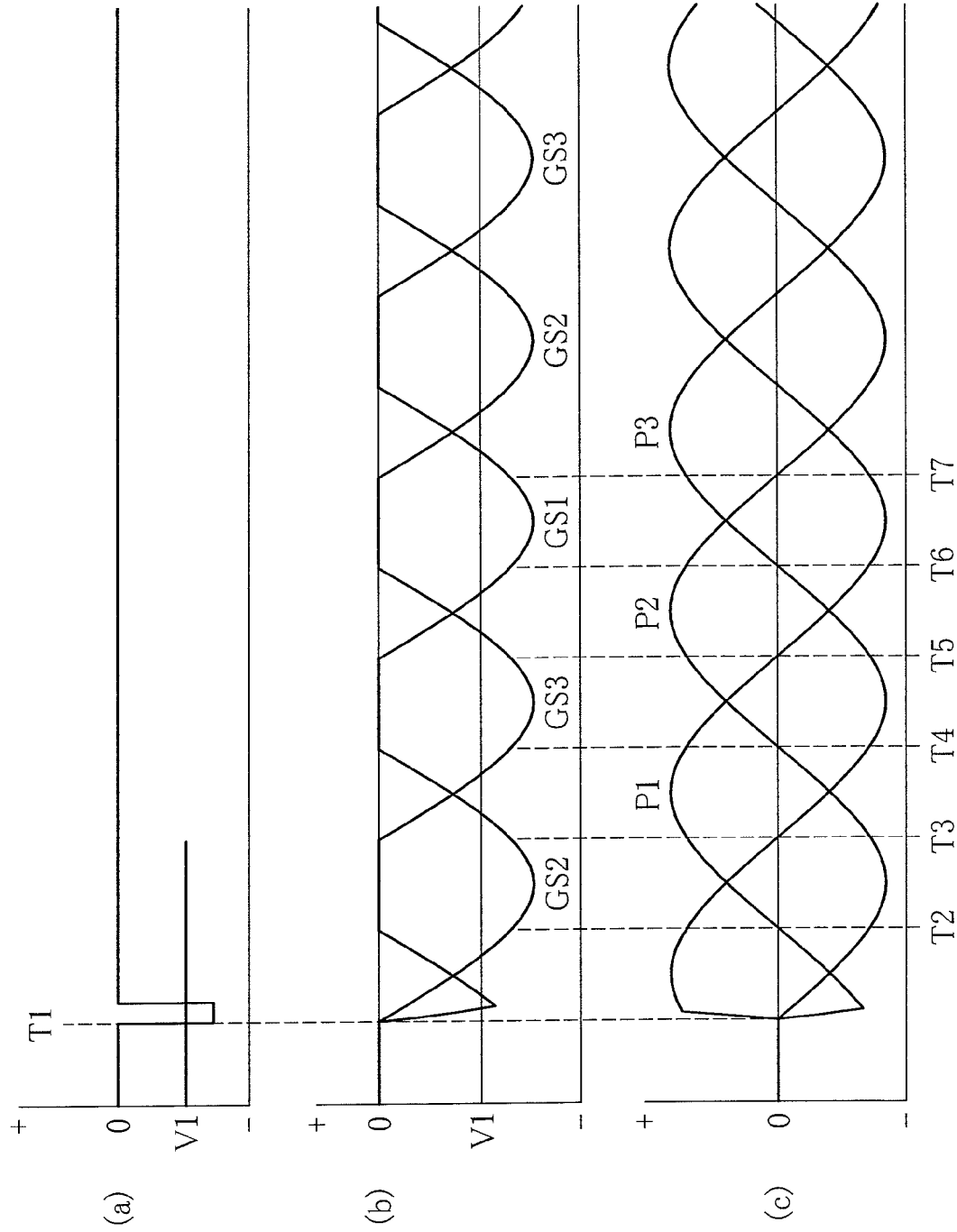
FIG. 2 is a timing chart illustrating startup and normal operation of the electricity generation device of the first embodiment.

FIG. 2 is a timing chart illustrating startup and normal operation of the electricity generation device 100 of the first embodiment, wherein FIG. 2(a) illustrates a startup gate signal output from the controller 70, FIG. 2(b) illustrates self-excited gate signals output from the self-excited gate signal generation circuit 30, and FIG. 2(c) illustrates output voltages of the three-phase AC generator 10.

Before the three-phase AC generator 10 is started, the first to third bidirectional thyristors TR1 to TR3 are all turned off, and therefore, all of the first- to third-phase windings L1 to L3 are disconnected from the neutral point N. Thus, even if rotary driving force is transmitted to the rotor to rotate same before the three-phase AC generator 10 is started, no current flows through the first- to third-phase windings L1 to L3, so that no electric power is generated.

To start the three-phase AC generator 10, a startup gate signal is output from the controller 70 to the gate of each of the first to third bidirectional thyristors TR1 to TR3 while the rotor of the generator 10 is rotating at a certain rotating speed or above (in FIG. 2(a), time T1). As a result, the first to third bidirectional thyristors TR1 to TR3 are concurrently turned on. That is, all of the first- to third-phase windings L1 to L3 are connected to the neutral point N and pass electric current therethrough. Consequently, as the rotor rotates, the three-phase AC generator 10 generates electricity and outputs three-phase AC power from its output terminals (FIG. 2(c)).

In FIG. 2(c), P1 indicates the waveform of a first-phase AC voltage excited in the first-phase winding L1, P2 indicates the waveform of a second-phase AC voltage excited in the second-phase winding L2, and P3 indicates the waveform of a third-phase AC voltage excited in the third-phase winding L3.

After the three-phase AC generator 10 begins to output three-phase AC power from its output terminals, self-excited gate signals are output from the self-excited gate signal generation circuit 30 (FIG. 2(b)). More specifically, a negative voltage excited in the first-phase winding L1 is output as a gate signal to the gate of each of the second and third bidirectional thyristors TR2 and TR3 (hereinafter referred to as "first gate signal GS1"). Similarly, a negative voltage excited in the second-phase winding L2 is output as a gate signal to the gate of each of the first and third bidirectional thyristors TR1 and TR3 (hereinafter referred to as "second gate signal G52"), and a negative voltage excited in the third-phase winding L3 is output as a gate signal to the gate of each of the first and second bidirectional thyristors TR1 and TR2 (hereinafter referred to as "third gate signal G53"). The voltages of the first to third gate signals GS1 to GS3 can be adjusted by varying the voltage division ratios between the resistors R1 and R2, R3 and R4, and R5 and R6, respectively. Also, the first to third bidirectional thyristors TR1 to TR3 are turned on when gate signals with a negative voltage higher than (in the negative direction) or equal to a trigger voltage V1 are input to their gates. Namely, a negative voltage equal to or higher than the trigger voltage V1 serves as an effective gate signal. The trigger voltage V1 is determined by the characteristics of the bidirectional thyristor.

The first gate signal GS1 is output, as a negative voltage equal to or higher than the trigger voltage V1, to the gates of the second and third bidirectional thyristors TR2 and TR3 during a period including the time (T7) at which the AC voltage excited in the second-phase winding L2 turns from positive to negative and during a period including the time (T6) at which the AC voltage excited in the third-phase winding L3 turns from negative to positive.

The second gate signal GS2 is output, as a negative voltage equal to or higher than the trigger voltage V1, to the gates of the first and third bidirectional thyristors TR1 and TR3 during a period including the time (T2) at which the AC voltage excited in the first-phase winding L1 turns from negative to positive and during a period including the time (T3) at which the AC voltage excited in the third-phase winding L3 turns from positive to negative.

The third gate signal GS3 is output, as a negative voltage equal to or higher than the trigger voltage V1, to the gates of the first and second bidirectional thyristors TR1 and TR2 during a period including the time (T5) at which the AC voltage excited in the first-phase winding L1 turns from positive to negative and during a period including the time (T4) at which the AC voltage excited in the second-phase winding L2 turns from negative to positive.

Accordingly, at the time (T2) when the AC voltage excited in the first-phase winding L1 turns from negative to positive, the first bidirectional thyristor TR1 is turned on by the second gate signal GS2, and at the time (T3) when the AC voltage excited in the third-phase winding L3 turns from positive to negative, the third bidirectional thyristor TR3 is turned on by the second gate signal GS2. Also, at the time (T4) when the AC voltage excited in the second-phase winding L2 turns from negative to positive, the second bidirectional thyristor TR2 is turned on by the third gate signal GS3, and at the time (T5) when the AC voltage excited in the first-phase winding L1 turns from positive to negative, the first bidirectional thyristor TR1 is turned on by the third gate signal GS3. At the time (T6) when the AC voltage excited in the third-phase winding L3 turns from negative to positive, the third bidirectional thyristor TR3 is turned on by the first gate signal GS1, and at the time (T7) when the AC voltage excited in the second-phase winding L2 turns from positive to negative, the second bidirectional thyristor TR2 is turned on by the first gate signal GS1.

That is to say, once the self-excited gate signal generation circuit 30 starts to output the self-excited gate signals, the first- to third-phase windings L1 to L3 are all kept connected to the neutral point N by the self-excited gate signals, so that the three-phase AC generator 10 continues normally generating electricity.

Figure 3:
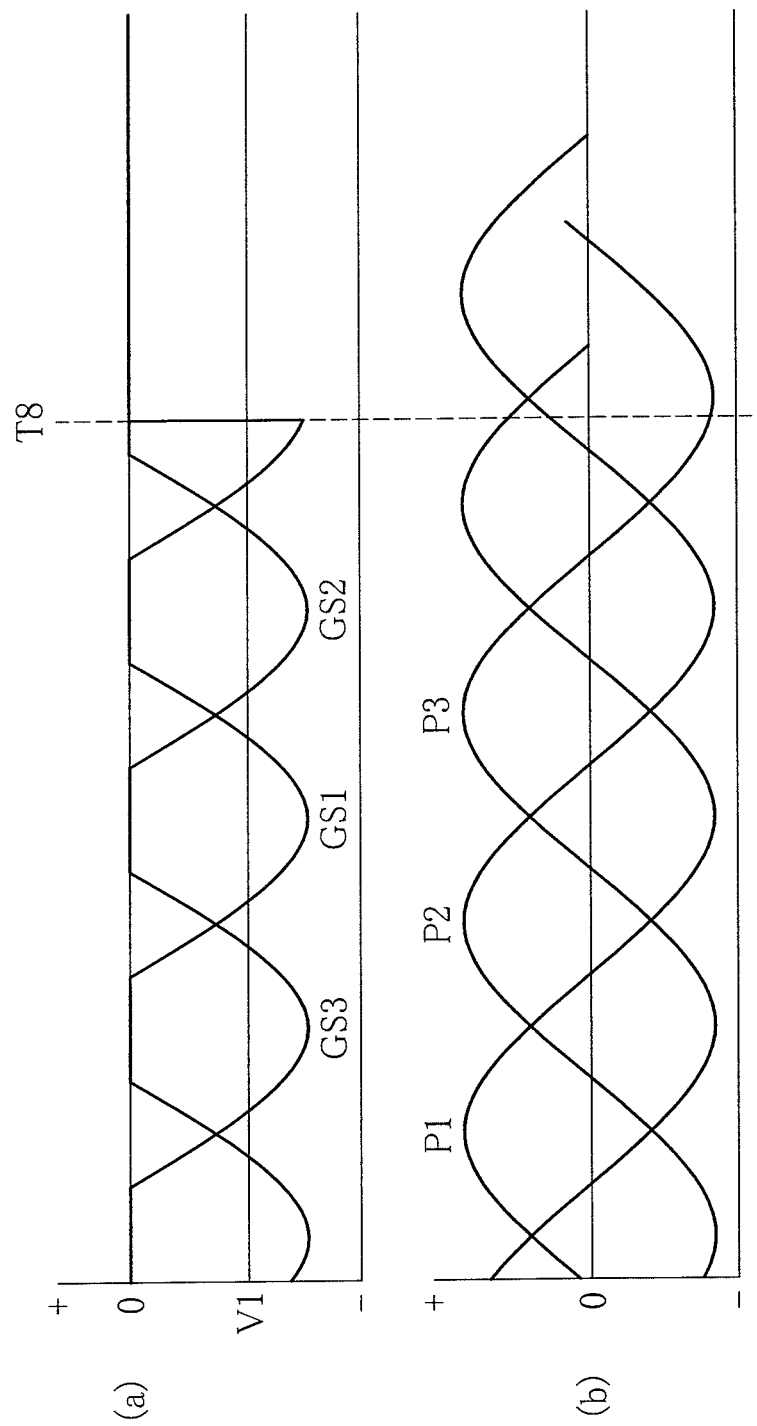
FIG. 3 is a timing chart illustrating stoppage of the electricity generation device of the first embodiment.

FIG. 3 is a timing chart illustrating stoppage of the electricity generation device 100 of the first embodiment, wherein FIG. 3(a) illustrates the self-excited gate signals output from the self-excited gate signal generation circuit 30, and FIG. 3(b) illustrates the output voltages of the three-phase AC generator 10.

When stopping the generation of electricity by the three-phase AC generator 10, the controller 70 performs OFF control by turning off the switches S1 to S3 of the gate signal shutoff circuit 40. When the switches S1 to S3 are turned off, all self-excited gate signals output from the self-excited gate signal generation circuit 30 are shut off (in FIG. 3(a), time T8). As a result, the first to third bidirectional thyristors TR1 to TR3 all turn off by themselves, so that the first- to third-phase windings L1 to L3 become disconnected from the neutral point N. Thus, even while the rotor keeps rotating, the three-phase AC generator 10 stops generating electricity (FIG. 3(b)).

FIG. 4 is a timing chart illustrating how the electricity generation device 100 of the first embodiment operates when phase-to-phase short circuit occurs, wherein FIG. 4(a) illustrates the self-excited gate signals output from the self-excited gate signal generation circuit 30, and FIG. 4(b) illustrates the output voltages of the three-phase AC generator 10.

In the following explanation, it is assumed that the phase voltage of the first-phase winding L1, for example, lowers due to phase-to-phase short circuit.

If the phase voltage of the first-phase winding L1 significantly lowers as a result of phase-to-phase short circuit (time T9), the voltage of the first gate signal GS1 generated by the negative voltage excited in the first-phase winding L1 drops below (approaches "0" away from) the trigger voltage V1 (FIG. 4(a)). As a result, the third bidirectional thyristor TR3 turns off by itself at the time (T10) when the voltage of the third-phase winding L3 becomes "0", and then the second bidirectional thyristor TR2 turns off by itself at the time (T11) when the voltage of the second-phase winding L2 becomes "0". Since the second and third bidirectional thyristors TR2 and TR3 turn off by themselves, the second- and third-phase windings L2 and L3 are disconnected from the neutral point N. The second and third gate signals GS2 and GS3 are not output any longer, and therefore, the first bidirectional thyristor TR1 turns off by itself at the time when the phase voltage of the first-phase winding L1 becomes "0", with the result that the first-phase winding L1 is disconnected from the neutral point N (time T12). At this point of time, the first- to third-phase windings L1 to L3 are no longer connected to the neutral point N, so that the first to third gate signals GS1 to GS3 are not output at all.

That is, when the phase voltage of the first-phase winding L1 lowers due to phase-to-phase short circuit caused within the three-phase AC generator 10, the first to third bidirectional thyristors TR1 to TR3 turn off by themselves one after another and come into a non-conduction state, with the result that the first- to third-phase windings L1 to L3 are all disconnected from the neutral point N. Thus, where phase-to-phase short circuit has occurred within the three-phase AC generator 10, the first- to third-phase windings L1 to L3 cease to pass current therethrough, and accordingly, short-circuit current attributable to the phase-to-phase short circuit can be promptly stopped even while the rotor is rotating. Since the short-circuit current attributable to phase-to-phase short circuit can be quickly stopped even while the rotor of the three-phase AC generator 10 is rotating, it is unnecessary to provide a clutch mechanism for interrupting the transmission of rotary driving force to the rotor, unlike the aforementioned conventional device. Accordingly, the electricity generation device 100 does not require complex structure and need not be increased in size.

As described above, according to the present invention, the electricity generation device 100 can be provided which is inexpensive and in which the three-phase AC generator 10 is less likely to suffer burnout or the like even if phase-to-phase short circuit occurs within the three-phase AC generator 10.

It is desirable that the gate signal shutoff circuit 40 capable of shutting off the gate signals output from the self-excited gate signal generation circuit 30 should be provided, as in the embodiment. The gate signal shutoff circuit 40 is not an element indispensable to the present invention, but by providing such a circuit, it is possible to promptly stop the generation of electricity by the three-phase AC generator 10 even during rotation of the rotor when some other anomaly than phase-to-phase short circuit occurs within the three-phase AC generator 10, for example.

It is also preferable that the second shutoff circuit 50 capable of shutting off the AC power outputs from the three-phase AC generator 10 to the converter 60 should be provided, as in the embodiment. The second shutoff circuit 50 is not an element indispensable to the present invention, but by providing such a circuit, it is possible to disconnect each of the first- to third-phase windings L1 to L3 at both terminals, whereby the possibility of the three-phase AC generator 10 suffering burnout or the like due to short-circuit current attributable to phase-to-phase short circuit can be further reduced. Also, when the load Z1 to which electric power is supplied from the electricity generation device 100 develops anomaly such as short circuit or ground fault, for example, the flow of short-circuit current or ground-fault current in the load Z1 can be promptly stopped by shutting off the outputs of the three-phase AC generator 10 by the second shutoff circuit 50.

Figure 5A:
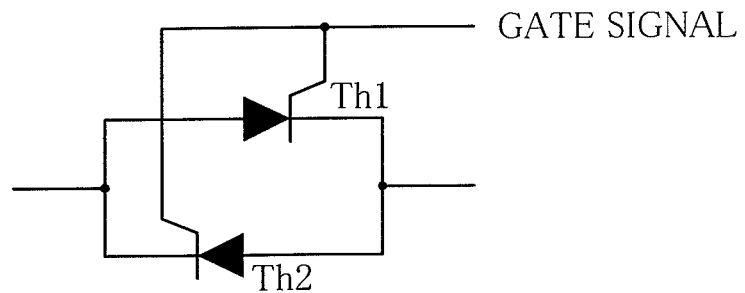
FIG. 5A illustrates modifications of a "bidirectional semiconductor switching circuit"
Figure 5B:
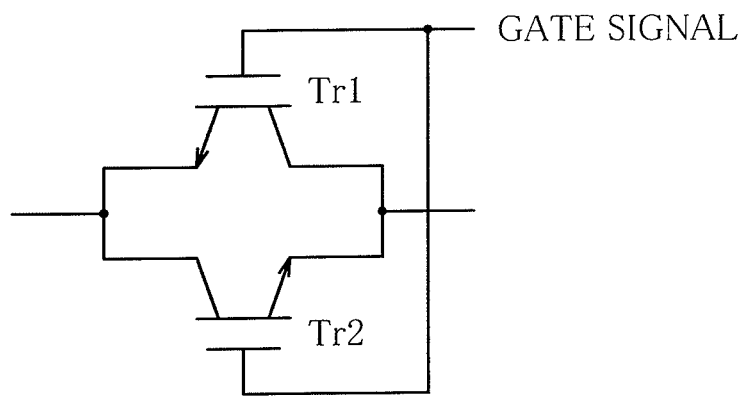
FIG. 5B illustrates modifications of a "bidirectional semiconductor switching circuit"

FIGS. 5(a) and 5(b) are circuit diagrams each illustrating a modification of the "bidirectional semiconductor switching circuit".

The "bidirectional semiconductor switching circuit" to be used in the present invention is not limited to the bidirectional thyristor illustrated in the above embodiment. For example, the "bidirectional semiconductor switching circuit" may be constituted by a combination of two thyristor Th1 and Th2 (FIG. 5(a)) or by a combination of two insulated gate bipolar transistors (IGBTs) Tr1 and Tr2 (FIG. 5(b)).

Figure 6:
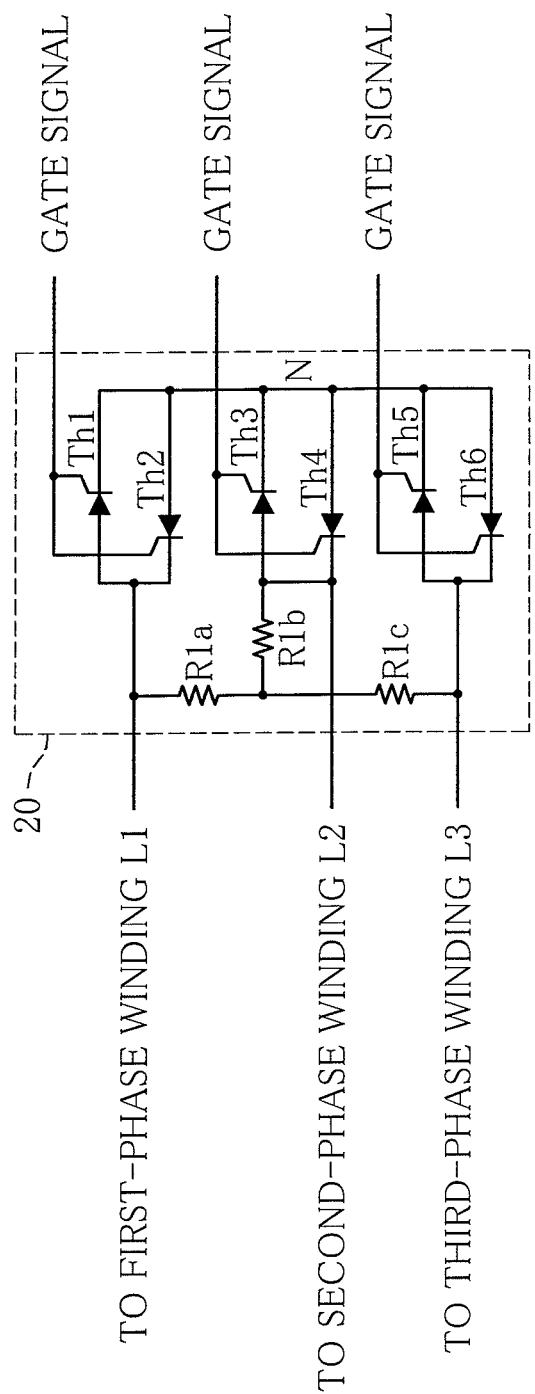
FIG. 6 is a circuit diagram illustrating a modification of a first shutoff circuit.

FIG. 6 is a circuit diagram illustrating a modification of the first shutoff circuit 20.

The modification of the first shutoff circuit 20 includes thyristors Th1 to Th6 and resistors R1a to R1c. The thyristors Th1 and Th2 are connected in an inverse-parallel fashion. Similarly, the thyristors Th3 and Th4 are connected in an inverse-parallel fashion, and the thyristors Th5 and Th6 are also connected in an inverse-parallel fashion. The cathodes of the thyristors Th1, Th3 and Th5 and the anodes of the thyristors Th2, Th4 and Th6 are connected to the neutral point N. The anode of the thyristor Th1 (cathode of the thyristor Th2) is connected to the other terminal of the first-phase winding L1 as well as to one terminal of the resistor R1a. Likewise, the anode of the thyristor Th3 (cathode of the thyristor Th4) is connected to the other terminal of the second-phase winding L2 as well as to one terminal of the resistor R1b, and the anode of the thyristor Th5 (cathode of the thyristor Th6) is connected to the other terminal of the third-phase winding L3 as well as to one terminal of the resistor R1c.

The resistors R1a to R1c are provided in order to fix the potentials at the anodes of the thyristors Th1, Th3 and Th5 (cathodes of the thyristors Th2, Th4 and Th6) (voltage fixing circuit). The circuit constituted by the resistors R1a to R1c is needed where the "bidirectional semiconductor switching circuit" is implemented by the circuit using the thyristors Th1 and Th2 (FIG. 5(a)) or by the circuit using the insulated gate bipolar transistors (IGBTs) Tr1 and Tr2 (FIG. 5(b)). Where bidirectional thyristors (first to third bidirectional thyristors TR1 to TR3 in FIG. 1) are used as the "bidirectional semiconductor switching circuits", on the other hand, the circuit constituted by the resistors R1a to R1c is unnecessary.

Figure 7:
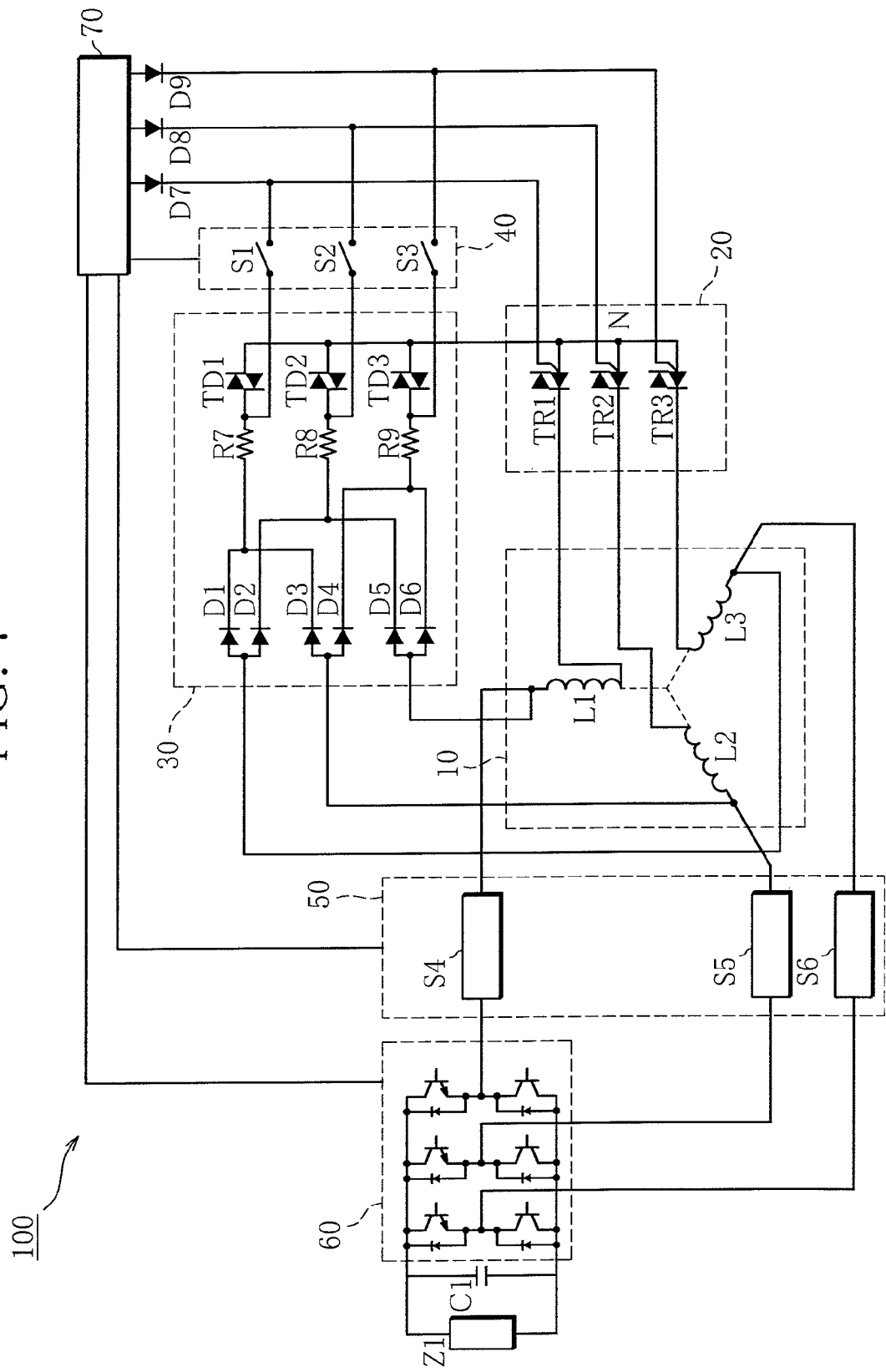
FIG. 7 illustrates an entire configuration of an electricity generation device according to a second embodiment.

Referring now to FIG. 7, a second embodiment of the present invention will be described.

FIG. 7 illustrates an entire configuration of an electricity generation device 100 according to the second embodiment.

The electricity generation device 100 of the second embodiment is identical in configuration to the electricity generation device 100 of the first embodiment except that the self-excited gate signal generation circuit 30 is configured differently from the counterpart. Thus, in the following description of the second embodiment, the configuration of the self-excited gate signal generation circuit 30 will be explained. In FIG. 7, like reference signs are used to denote like elements also used in the first embodiment, and description of such elements is omitted. Also, since the self-excited gate signal generation circuit 30 of the second embodiment operates in substantially the same manner as the counterpart of the first embodiment, explanation of the operation with reference to timing charts is omitted.

The self-excited gate signal generation circuit 30 of the second embodiment includes diodes D1 to D6, resistors R7 to R9, and trigger diodes TD1 to TD3. The anodes of the diodes D1 and D2 are connected to the output terminal of the third-phase winding L3 of the three-phase AC generator 10. The anodes of the diodes D3 and D4 are connected to the output terminal of the second-phase winding L2 of the three-phase AC generator 10, and the anodes of the diodes D5 and D6 are connected to the output terminal of the first-phase winding L1 of the three-phase AC generator 10. The resistors R7 to R9 have an identical resistance value and serve to limit the currents flowing through the respective trigger diodes TD1 to TD3 to a rated current or below.

The cathodes of the diodes D1 and D3 are connected to one terminal of the resistor R7, of which the other terminal is connected to one terminal of the trigger diode TD1. The other terminal of the trigger diode TD1 is connected via the gate signal shutoff circuit 40 to the gate of the first bidirectional thyristor TR1. That is, the logical sum of the phase voltages of the second- and third-phase windings L2 and L3 is output from the trigger diode TD1 as a trigger signal, which is applied to the first bidirectional thyristor TR1 as the gate signal.

The cathodes of the diodes D2 and D5 are connected to one terminal of the resistor R8, of which the other terminal is connected to one terminal of the trigger diode TD2. The other terminal of the trigger diode TD2 is connected via the gate signal shutoff circuit 40 to the gate of the second bidirectional thyristor TR2. That is to say, the logical sum of the phase voltages of the first- and third-phase windings L1 and L3 is output from the trigger diode TD2 as a trigger signal, which is applied to the second bidirectional thyristor TR2 as the gate signal.

Similarly, the cathodes of the diodes D4 and D6 are connected to one terminal of the resistor R9, of which the other terminal is connected to one terminal of the trigger diode TD3. The other terminal of the trigger diode TD3 is connected via the gate signal shutoff circuit 40 to the gate of the third bidirectional thyristor TR3. Namely, the logical sum of the phase voltages of the first- and second-phase windings L1 and L2 is output from the trigger diode TD3 as a trigger signal, which is applied to the third bidirectional thyristor TR3 as the gate signal.

The self-excited gate signal generation circuit 30 configured in this manner may also be used to carry out the present invention and can provide the intended advantageous effects.

A third embodiment of the present invention will be now described with reference to FIGS. 8 to 10.

Figure 8:
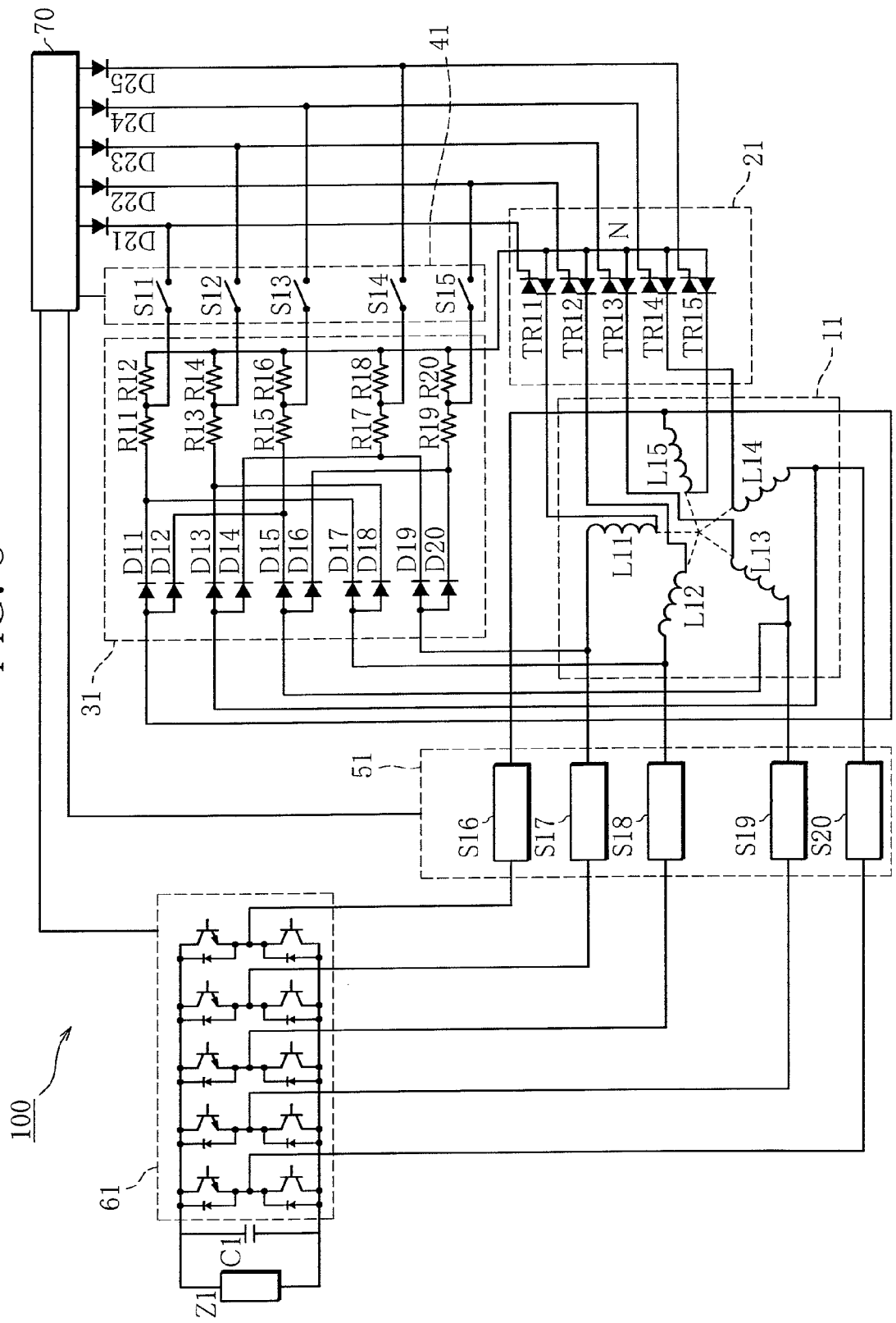
FIG. 8 illustrates an entire configuration of an electricity generation device according to a third embodiment.

Referring first to FIG. 8, the configuration of an electricity generation device 100 according to the third embodiment will be explained.

FIG. 8 illustrates an entire configuration of the electricity generation device 100 of the third embodiment.

In the electricity generation device 100 of the third embodiment, AC power generated by a five-phase AC generator 11 is converted to direct-current power by a converter circuit 61 and a smoothing capacitor C1, and the direct-current power is supplied to a load Z1. The electricity generation device 100 is further provided with a first shutoff circuit 21, a self-excited gate signal generation circuit 31, a gate signal shutoff circuit 41, a second shutoff circuit 51, and a controller 70.

The five-phase AC generator 11 is a "permanent-magnet electric generator" using permanent magnets as its field system, and includes a stator constituted by first-, second-, third-, fourth- and fifth-phase windings L11, L12, L13, L14 and L15, and a rotor (not shown) constituted by the permanent magnets that rotate inside the stator. The first- to fifth-phase windings L11 to L15 are arranged with their phases shifted from each other by 72 degrees in the rotating direction of the rotor, and each have one end serving as an output terminal and the other end connected to a neutral point N. The five-phase AC generator 11 generates five-phase AC power as the rotor is rotated by rotary driving force transmitted thereto from a drive source such as an engine.

The first shutoff circuit 21 includes first, second, third, fourth and fifth bidirectional thyristors TR11, TR12, TR13, TR14 and TR15. Each of the first to fifth bidirectional thyristors TR11 to TR15 is a commonly known "bidirectional semiconductor switching circuit" which, in a conduction state, allows electric current to flow therethrough in both directions and which, after a gate signal is input, retains the conduction state by itself until the electric current stops flowing therethrough. The first bidirectional thyristor TR11 is connected between the first-phase winding L11 of the five-phase AC generator 11 and the neutral point N and capable of interrupting the connection between the first-phase winding L11 and the neutral point N. Similarly, the second bidirectional thyristor TR12 is connected between the second-phase winding L12 of the five-phase AC generator 11 and the neutral point N and capable of interrupting the connection between the second-phase winding L12 and the neutral point N, and the third bidirectional thyristor TR13 is connected between the third-phase winding L13 of the five-phase AC generator 11 and the neutral point N and capable of interrupting the connection between the third-phase winding L13 and the neutral point N. The fourth bidirectional thyristor TR14 is connected between the fourth-phase winding L14 of the five-phase AC generator 11 and the neutral point N and capable of interrupting the connection between the fourth-phase winding L14 and the neutral point N, and the fifth bidirectional thyristor TR15 is connected between the fifth-phase winding L15 of the five-phase AC generator 11 and the neutral point N and capable of interrupting the connection between the fifth-phase winding L15 and the neutral point N. The first to fifth bidirectional thyristors TR11 to TR15 are each input at their gate with a gate signal from the self-excited gate signal generation circuit 31 or the controller 70.

The self-excited gate signal generation circuit 31 includes diodes D11 to D20 and resistors R11 to R20. The diodes D11 and D12 have their anodes connected to the output terminal of the fifth-phase winding L15 of the five-phase AC generator 11. The diodes D13 and D14 have their anodes connected to the output terminal of the fourth-phase winding L14 of the five-phase AC generator 11, and the diodes D15 and D16 have their anodes connected to the output terminal of the third-phase winding L13 of the five-phase AC generator 11. The diodes D17 and D18 have their anodes connected to the output terminal of the second-phase winding L12 of the five-phase AC generator 11, and the diodes D19 and D20 have their anodes connected to the output terminal of the first-phase winding L11 of the five-phase AC generator 11. The resistors R11, R13, R15, R17 and R19 have an identical resistance value, and the resistors R12, R14, R16, R18 and R20 have an identical resistance value.

The diodes D11 and D17 have their cathodes connected to one terminal of the resistor R11. The other terminal of the resistor R11 is connected to one terminal of the resistor R12, of which the other terminal is connected to the neutral point N of the five-phase AC generator 11. The node between the resistors R11 and R12 is connected via the gate signal shutoff circuit 41 to the gate of the first bidirectional thyristor TR11. That is, a voltage obtained by dividing the logical sum of phase voltages of the second- and fifth-phase windings L12 and L15 by the resistance ratio of the resistors R11 and R12 is applied as a gate signal to the first bidirectional thyristor TR11.

Similarly, the diodes D13 and D18 have their cathodes connected to one terminal of the resistor R13. The other terminal of the resistor R13 is connected to one terminal of the resistor R14, of which the other terminal is connected to the neutral point N of the five-phase AC generator 11. The node between the resistors R13 and R14 is connected via the gate signal shutoff circuit 41 to the gate of the third bidirectional thyristor TR13. Namely, a voltage obtained by dividing the logical sum of phase voltages of the second- and fourth-phase windings L12 and L14 by the resistance ratio of the resistors R13 and R14 is applied as a gate signal to the third bidirectional thyristor TR13.

The diodes D12 and D15 have their cathodes connected to one terminal of the resistor R15. The other terminal of the resistor R15 is connected to one terminal of the resistor R16, of which the other terminal is connected to the neutral point N of the five-phase AC generator 11. The node between the resistors R15 and R16 is connected via the gate signal shutoff circuit 41 to the gate of the fourth bidirectional thyristor TR14. That is, a voltage obtained by dividing the logical sum of phase voltages of the third- and fifth-phase windings L13 and L15 by the resistance ratio of the resistors R15 and R16 is applied as a gate signal to the fourth bidirectional thyristor TR14.

Likewise, the diodes D14 and D19 have their cathodes connected to one terminal of the resistor R17. The other terminal of the resistor R17 is connected to one terminal of the resistor R18, of which the other terminal is connected to the neutral point N of the five-phase AC generator 11. The node between the resistors R17 and R18 is connected via the gate signal shutoff circuit 41 to the gate of the fifth bidirectional thyristor TR15. Namely, a voltage obtained by dividing the logical sum of phase voltages of the first- and fourth-phase windings L11 and L14 by the resistance ratio of the resistors R17 and R18 is applied as a gate signal to the fifth bidirectional thyristor TR15.

The diodes D16 and D20 have their cathodes connected to one terminal of the resistor R19. The other terminal of the resistor R19 is connected to one terminal of the resistor R20, of which the other terminal is connected to the neutral point N of the five-phase AC generator 11. The node between the resistors R19 and R20 is connected via the gate signal shutoff circuit 41 to the gate of the second bidirectional thyristor TR12. That is, a voltage obtained by dividing the logical sum of phase voltages of the first- and third-phase windings L11 and L13 by the resistance ratio of the resistors R19 and R20 is applied as a gate signal to the second bidirectional thyristor TR12.

The gate signal shutoff circuit 41 includes five switches S11 to S15 capable of shutting off the respective gate signals output from the self-excited gate signal generation circuit 31. The switch S11 is able to pass and shut off the gate signal output from the node between the resistors R11 and R12 to the gate of the first bidirectional thyristor TR11. Similarly, the switch S12 is able to pass and shut off the gate signal output from the node between the resistors R13 and R14 to the gate of the second bidirectional thyristor TR12, and the switch S13 is able to pass and shut off the gate signal output from the node between the resistors R15 and R16 to the gate of the third bidirectional thyristor TR13. The switch S14 is able to pass and shut off the gate signal output from the node between the resistors R17 and R18 to the gate of the fourth bidirectional thyristor TR14, and the switch S15 is able to pass and shut off the gate signal output from the node between the resistors R19 and R20 to the gate of the fifth bidirectional thyristor TR15.

The second shutoff circuit 51, which is an "output shutoff circuit", includes five circuit breakers S16 to S20 capable of shutting off the respective AC outputs from the five-phase AC generator 11 to the converter circuit 61. The circuit breaker S16 is able to shut off the output from the first-phase winding L11 to the converter circuit 61. Similarly, the circuit breaker S17 is able to shut off the output from the second-phase winding L12 to the converter circuit 61, and the circuit breaker S18 is able to shut off the output from the third-phase winding L13 to the converter circuit 61. The circuit breaker S19 is able to shut off the output from the fourth-phase winding L14 to the converter circuit 61, and the circuit breaker S20 is able to shut off the output from the fifth-phase winding L15 to the converter circuit 61.

The controller 70, which is configured in the same manner as the counterpart of the first embodiment, includes a microcomputer control circuit known in the art and is connected via diodes D21 to D25 to the gates of the first to fifth bidirectional thyristors TR11 to TR15, respectively. When the five-phase AC generator 11 is to be started, the controller 70 outputs gate signals to the first to fifth bidirectional thyristors TR11 to TR15, respectively. The controller 70 is connected to the gate signal shutoff circuit 41 and controls the switches S11 to S15. Also, the controller 70 is connected to the second shutoff circuit 51 and controls the circuit breakers S16 to S20. Further, the controller 70 is connected to the converter circuit 61 and controls the voltage of the direct-current power output from the converter circuit 61.

Referring now to the timing charts of FIGS. 9 and 10, the operation of the electricity generation device 100 of the third embodiment will be explained.

Figure 9:
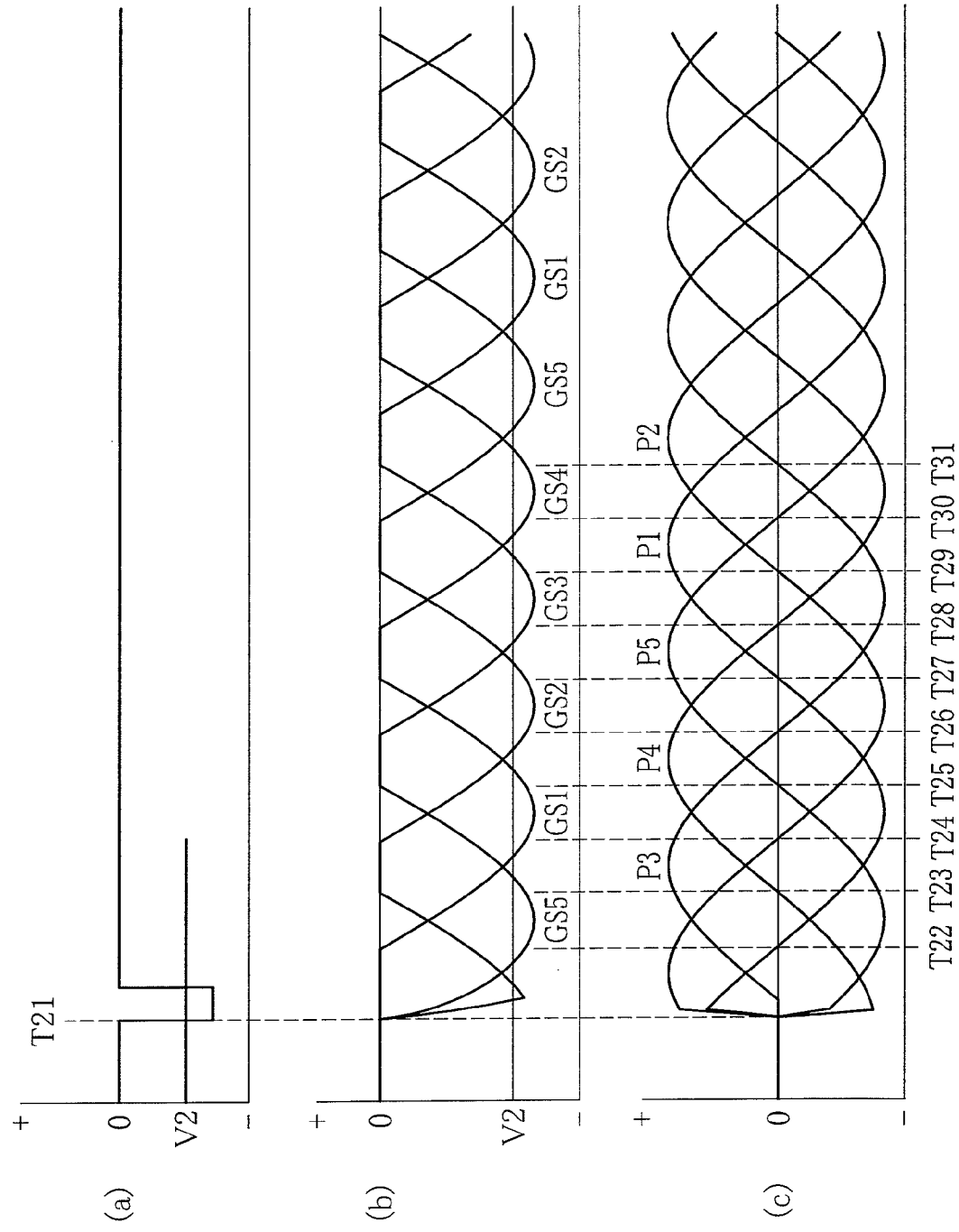
FIG. 9 is a timing chart illustrating startup and normal operation of the electricity generation device of the third embodiment.

FIG. 9 is a timing chart illustrating startup and normal operation of the electricity generation device 100 of the third embodiment, wherein FIG. 9(a) illustrates a startup gate signal output from the controller 70, FIG. 9(b) illustrates self-excited gate signals output from the self-excited gate signal generation circuit 31, and FIG. 9(c) illustrates output voltages of the five-phase AC generator 11.

Before the five-phase AC generator 11 is started, the first to fifth bidirectional thyristors TR11 to TR15 are all turned off, and therefore, all of the first- to fifth-phase windings L11 to L15 are disconnected from the neutral point N. Thus, even if rotary driving force is transmitted to the rotor to rotate same before the five-phase AC generator 11 is started, no current flows through the first- to fifth-phase windings L11 to L15, so that no electric power is generated.

To start the five-phase AC generator 11, a startup gate signal is output from the controller 70 to the gate of each of the first to fifth bidirectional thyristors TR11 to TR15 while the rotor of the generator 11 is rotating at a certain rotating speed or above (in FIG. 9(a), time T21). As a result, the first to fifth bidirectional thyristors TR11 to TR15 are concurrently turned on. That is, all of the first- to fifth-phase windings L11 to L15 are connected to the neutral point N and pass electric current therethrough. Consequently, as the rotor rotates, the five-phase AC generator 11 generates electricity and outputs five-phase AC power from its output terminals (FIG. 9(c)).

In FIG. 9(c), P1 indicates the waveform of a first-phase AC voltage excited in the first-phase winding L11, P2 indicates the waveform of a second-phase AC voltage excited in the second-phase winding L12, P3 indicates the waveform of a third-phase AC voltage excited in the third-phase winding L13, P4 indicates the waveform of a fourth-phase AC voltage excited in the fourth-phase winding L14, and P5 indicates the waveform of a fifth-phase AC voltage excited in the fifth-phase winding L15.

After the five-phase AC generator 11 begins to output five-phase AC power from its output terminals, self-excited gate signals are output from the self-excited gate signal generation circuit 31 (FIG. 9(b)). More specifically, a negative voltage excited in the first-phase winding L11 is output as a gate signal to the gate of each of the second and fifth bidirectional thyristors TR12 and TR15 (hereinafter referred to as "first gate signal GS1"). Similarly, a negative voltage excited in the second-phase winding L12 is output as a gate signal to the gate of each of the first and third bidirectional thyristors TR11 and TR13 (hereinafter referred to as "second gate signal G52"), and a negative voltage excited in the third-phase winding L13 is output as a gate signal to the gate of each of the second and fourth bidirectional thyristors TR12 and TR14 (hereinafter referred to as "third gate signal G53"). A negative voltage excited in the fourth-phase winding L14 is output as a gate signal to the gate of each of the third and fifth bidirectional thyristors TR13 and TR15 (hereinafter referred to as "fourth gate signal G54"), and a negative voltage excited in the fifth-phase winding L15 is output as a gate signal to the gate of each of the first and fourth bidirectional thyristors TR11 and TR14 (hereinafter referred to as "fifth gate signal G55"). The first to fifth bidirectional thyristors TR11 to TR15 are turned on when gate signals with a negative voltage higher than (in the negative direction) or equal to a trigger voltage V2 are input to their gates. Namely, a negative voltage equal to or higher than the trigger voltage V2 serves as an effective gate signal. The trigger voltage V2 is determined by the characteristics of the bidirectional thyristor.

The first gate signal GS1 is output, as a negative voltage equal to or higher than the trigger voltage V2, to the gates of the second and fifth bidirectional thyristors TR12 and TR15 during a period including the time (T24) at which the AC voltage excited in the second-phase winding L12 turns from positive to negative and during a period including the time (T25) at which the AC voltage excited in the fifth-phase winding L15 turns from negative to positive.

Similarly, the second gate signal GS2 is output, as a negative voltage equal to or higher than the trigger voltage V2, to the gates of the first and third bidirectional thyristors TR11 and TR13 during a period including the time (T27) at which the AC voltage excited in the first-phase winding L11 turns from negative to positive and during a period including the time (T26) at which the AC voltage excited in the third-phase winding L13 turns from positive to negative.

The third gate signal GS3 is output, as a negative voltage equal to or higher than the trigger voltage V2, to the gates of the second and fourth bidirectional thyristors TR12 and TR14 during a period including the time (T29) at which the AC voltage excited in the second-phase winding L12 turns from negative to positive and during a period including the time (T28) at which the AC voltage excited in the fourth-phase winding L14 turns from positive to negative.

Likewise, the fourth gate signal GS4 is output, as a negative voltage equal to or higher than the trigger voltage V2, to the gates of the third and fifth bidirectional thyristors TR13 and TR15 during a period including the time (T31) at which the AC voltage excited in the third-phase winding L13 turns from negative to positive and during a period including the time (T30) at which the AC voltage excited in the fifth-phase winding L15 turns from positive to negative.

The fifth gate signal GS5 is output, as a negative voltage equal to or higher than the trigger voltage V2, to the gates of the first and fourth bidirectional thyristors TR11 and TR14 during a period including the time (T22) at which the AC voltage excited in the first-phase winding L11 turns from positive to negative and during a period including the time (T23) at which the AC voltage excited in the fourth-phase winding L14 turns from negative to positive.

Accordingly, at the time (T22) when the AC voltage excited in the first-phase winding L11 turns from positive to negative, the first bidirectional thyristor TR11 is turned on by the fifth gate signal GS5, and at the time (T23) when the AC voltage excited in the fourth-phase winding L14 turns from negative to positive, the fourth bidirectional thyristor TR14 is turned on by the fifth gate signal GS5. Also, at the time (T24) when the AC voltage excited in the second-phase winding L12 turns from positive to negative, the second bidirectional thyristor TR12 is turned on by the first gate signal GS1, and at the time (T25) when the AC voltage excited in the fifth-phase winding L15 turns from negative to positive, the fifth bidirectional thyristor TR15 is turned on by the first gate signal GS1. At the time (T26) when the AC voltage excited in the third-phase winding L13 turns from positive to negative, the third bidirectional thyristor TR13 is turned on by the second gate signal GS2, and at the time (T27) when the AC voltage excited in the first-phase winding L11 turns from negative to positive, the first bidirectional thyristor TR11 is turned on by the second gate signal GS2. At the time (T28) when the AC voltage excited in the fourth-phase winding L14 turns from positive to negative, the fourth bidirectional thyristor TR14 is turned on by the third gate signal GS3, and at the time (T29) when the AC voltage excited in the second-phase winding L12 turns from negative to positive, the second bidirectional thyristor TR12 is turned on by the third gate signal GS3. Then, at the time (T30) when the AC voltage excited in the fifth-phase winding L15 turns from positive to negative, the fifth bidirectional thyristor TR15 is turned on by the fourth gate signal GS4, and at the time (T31) when the AC voltage excited in the third-phase winding L13 turns from negative to positive, the third bidirectional thyristor TR13 is turned on by the fourth gate signal GS4.

That is to say, once the self-excited gate signal generation circuit 31 starts to output the gate signals, the first- to fifth-phase windings L11 to L15 are all kept connected to the neutral point N by the gate signals, so that the five-phase AC generator 11 continues normally generating electricity.

Figure 10:
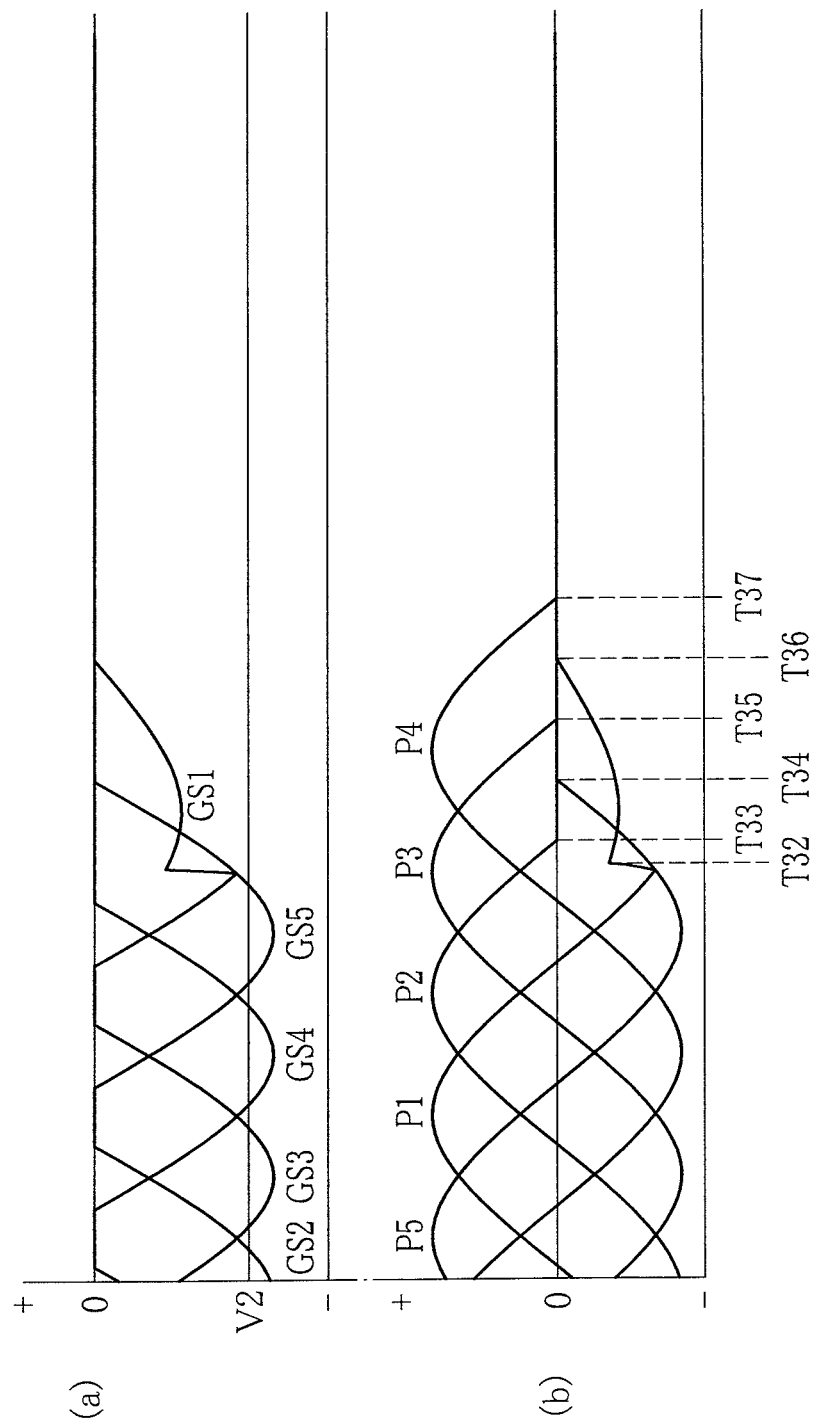
FIG. 10 is a timing chart illustrating how the electricity generation device of the third embodiment operates when phase-to-phase short circuit occurs.

FIG. 10 is a timing chart illustrating how the electricity generation device 100 of the third embodiment operates when phase-to-phase short circuit occurs, wherein FIG. 10(a) illustrates the self-excited gate signals output from the self-excited gate signal generation circuit 31, and FIG. 10(b) illustrates the output voltages of the five-phase AC generator 11.

In the following explanation, it is assumed that the phase voltage of the first-phase winding L11, for example, lowers due to phase-to-phase short circuit.

If the phase voltage of the first-phase winding L11 significantly lowers as a result of phase-to-phase short circuit (time T32), the voltage of the first gate signal GS1 generated by the negative voltage excited in the first-phase winding L11 drops below (approaches "0" away from) the trigger voltage V2 (FIG. 10(a)). As a result, the second bidirectional thyristor TR12 turns off by itself at the time (T33) when the voltage of the second-phase winding L12 becomes "0", and then the fifth bidirectional thyristor TR15 turns off by itself at the time (T34) when the voltage of the fifth-phase winding L15 becomes "0". Since the second and fifth bidirectional thyristors TR12 and TR15 turn off by themselves, the second- and fifth-phase windings L12 and L15 are disconnected from the neutral point N.

As a result of the disconnection of the second-phase winding L12 from the neutral point N, the second gate signal GS2 is not output any longer, and therefore, the third bidirectional thyristor TR13 turns off by itself at the time when the phase voltage of the third-phase winding L13 becomes "0", so that the third-phase winding L13 is disconnected from the neutral point N (time T35). Subsequently, the first bidirectional thyristor TR11 turns off by itself at the time when the phase voltage of the first-phase winding L11 becomes "0", with the result that the first-phase winding L11 is disconnected from the neutral point N (time T36). Then, as a result of the disconnection of the third-phase winding L13 from the neutral point N, the third gate signal GS3 is not output any longer, and accordingly, the fourth bidirectional thyristor TR14 turns off by itself at the time when the phase voltage of the fourth-phase winding L14 becomes "0", so that the fourth-phase winding L14 is disconnected from the neutral point N (time T37). At this point of time, the first- to fifth-phase windings L11 to L15 are no longer connected to the neutral point N, so that the first to fifth gate signals GS1 to GS5 are not output at all.

That is, when the phase voltage of the first-phase winding L11 lowers due to phase-to-phase short circuit caused within the five-phase AC generator 11, the first to fifth bidirectional thyristors TR11 to TR15 turn off by themselves one after another and come into a non-conduction state, with the result that the first- to fifth-phase windings L11 to L15 are all disconnected from the neutral point N. Thus, where phase-to-phase short circuit has occurred within the five-phase AC generator 11, current ceases flowing through the first- to fifth-phase windings L11 to L15, and therefore, short-circuit current attributable to the phase-to-phase short circuit can be promptly stopped even while the rotor is rotating. Since the short-circuit current attributable to phase-to-phase short circuit can be quickly stopped even while the rotor of the five-phase AC generator 11 is rotating, it is unnecessary to provide a clutch mechanism for interrupting the transmission of rotary driving force to the rotor, unlike the conventional device. Accordingly, the electricity generation device 100 does not require a complex structure and need not be increased in size.

As described above, according to the present invention, the electricity generation device 100 can be provided which is inexpensive and in which the five-phase AC generator 11 is less likely to suffer burnout or the like even if phase-to-phase short circuit occurs within the five-phase AC generator 11.

It is to be noted that the present invention is not limited to the foregoing embodiments and may be modified in various ways without departing from the scope of the invention in the appended claims.

For example, in the three- and five-phase AC generators 10 and 11 of the foregoing embodiments, concentrated winding is preferably employed for each phase winding. In concentrated winding, only the winding of a single phase exists in an identical slot, and therefore, the possibility of phase-to-phase short circuit can be reduced, compared with distributed winding in which windings of different phases exist in an identical slot and thus are located adjacent to each other.

Also, in the three- and five-phase AC generators 10 and 11 of the foregoing embodiments, the winding start and end terminals of each phase winding are preferably guided to outside in opposite directions, for example. This serves to reduce the possibility that the winding start and end terminals of the individual phase windings guided to outside of the three- and five-phase AC generators 10 and 11 contact with each other and thus are short-circuited.

Further, the three- and five-phase AC generators 10 and 11 of the foregoing embodiments may be configured such that the first shutoff circuits 20 and 21 are respectively built therein, for example. The three- and five-phase AC generators 10 and 11 with such configuration also fall under the scope of the present invention.

What is claimed is:

1. An electricity generation device comprising:
   a permanent-magnet electric generator including three or more phase windings each having one end serving as an output terminal and the other end connected to a neutral point;
   bidirectional semiconductor switching circuits connected between the respective phase windings of the permanent-magnet electric generator and the neutral point and capable of interrupting connections between the respective phase windings and the neutral point, each of the bidirectional semiconductor switching circuits allowing electric current to flow therethrough in both directions in a conduction state and, after being input with a gate signal, retaining the conduction state by itself until the electric current stops flowing therethrough;
   a self-excited gate signal generation circuit configured to generate a gate signal for each of the bidirectional semiconductor switching circuits associated with the respective phase windings of the permanent-magnet electric generator from alternating-current voltages excited in those of the phase windings which are associated with others of the bidirectional semiconductor switching circuits in such a manner that the gate signal is output to one of the bidirectional semiconductor switching circuits during a period including a time at which the alternating-current voltage excited in a corresponding one of the phase windings turns from positive to negative and during a period including a time at which the alternating-current voltage excited in the corresponding one of the phase windings turns from negative to positive; and
   a startup gate signal output circuit configured to output a startup gate signal to all of the bidirectional semiconductor switching circuits when the permanent-magnet electric generator is to be started.

2. The electricity generation device according to claim 1, further comprising a gate signal shutoff circuit capable of shutting off the gate signals output from the self-excited gate signal generation circuit.

3. The electricity generation device according to claim 1, further comprising an output shutoff circuit capable of shutting off outputs of the permanent-magnet electric generator.

4. The electricity generation device according to claim 1, wherein each of the bidirectional semiconductor switching circuits is a bidirectional thyristor.

5. The electricity generation device according to claim 1, wherein the phase windings of the permanent-magnet electric generator are each constituted by a concentrated winding.

6. The electricity generation device according to claim 1, wherein the phase windings of the permanent-magnet electric generator each have winding start and end terminals guided to outside in opposite directions.

\* \* \* \* \*